US 6,700,686 B2

(12) United States Patent
King et al.

(10) Patent No.: US 6,700,686 B2
(45) Date of Patent: Mar. 2, 2004

(54) SYSTEM AND METHOD FOR HOLOGRAPHIC STORAGE

(75) Inventors: Brian King, Longmont, CO (US); Michael Tackitt, Lyons, CO (US)

(73) Assignee: InPhase Technologies, Inc., Longmont, CO (US)

( * ) Notice: Subject to any disclaimer, the term of this patent is extended or adjusted under 35 U.S.C. 154(b) by 0 days.

(21) Appl. No.: 10/056,746

(22) Filed: Jan. 24, 2002

(65) Prior Publication Data

US 2003/0072045 A1 Apr. 17, 2003

Related U.S. Application Data

(60) Provisional application No. 60/329,950, filed on Oct. 17, 2001.

(51) Int. Cl.[7] .................................................. G03H 1/12
(52) U.S. Cl. ............................ 359/11; 359/10; 359/35
(58) Field of Search .............................. 359/11, 10, 21, 359/29, 30, 31, 35; 235/457, 462.34, 462.33, 462.35, 462.36, 462.38, 462.4

(56) References Cited

U.S. PATENT DOCUMENTS

| | | | | |
|---|---|---|---|---|
| 3,615,123 A | * | 10/1971 | Wuerker | 359/24 |
| 3,937,555 A | * | 2/1976 | Kurtz | 359/11 |
| 4,478,481 A | * | 10/1984 | Fusek et al. | 359/30 |
| 4,714,309 A | * | 12/1987 | Woodcock et al. | 359/34 |
| 4,806,728 A | * | 2/1989 | Salzer et al. | 219/121.63 |
| 5,483,365 A | | 1/1996 | Pu et al. | 359/11 |
| 5,529,861 A | * | 6/1996 | Redfield | 430/1 |
| 5,978,112 A | * | 11/1999 | Psaltis et al. | 359/22 |
| 6,157,473 A | * | 12/2000 | Jang et al. | 359/22 |

OTHER PUBLICATIONS

K. Curtis, A. Pu, D. Psaltis, "Method for holographic storage using peristrophic multiplexing", Opt. Lett., vol. 19, No. 13, Jul. 1, 1994, pp. 993–994.*
E. Chuang, D. Psaltis, "Storage of 1000 holograms with use of a dual–wavelength method", Appl. Opt., vol. 36, No. 32, Nov. 10, 1997, pp. 8445–8454.*
H. J. Coufal et al., "Holographic Data Storage", Springer 2000, pp. 21–61.
H. J. Coufal et al., "Holographic Data Storage", Springer 2000, pp. 241–257.
P. J. van Heerden "Theory of Optical Information Storage in Solids", Applied Optics, vol. 2, No. 4, Apr. 1963, pp. 393–400.
D. Psaltis et al., "Holographic Memories", Sci. American, Nov. 1995, pp. 52–58.

* cited by examiner

Primary Examiner—Thong Nguyen
Assistant Examiner—Arnel C. Lavarias
(74) Attorney, Agent, or Firm—Morrison & Foerster LLP

(57) ABSTRACT

The present invention provides a solution to the needs described above through a system and method for holographic storage. The system comprises a laser light source, a first beam splitter for splitting a light beam into an object and reference beam, an elliptical reflector with a first and second focal point, a reflector rotatable about a first axis and a second axis, a pattern encoder, and a holographic storage medium. The reflector is located at the first focal point of the elliptical mirror, and the holographic storage medium is located at the second focal point of the elliptical mirror.

21 Claims, 6 Drawing Sheets

SYSTEM AND METHOD FOR HOLOGRAPHIC STORAGE

CROSS REFERENCE TO RELATED APPLICATIONS

This application claims the benefit of U.S. provisional application No. 60/329,950, filed Oct. 17, 2001, which is incorporated by reference herein in its entirety.

TECHNICAL FIELD

The present invention relates to the general field of holographic memory. More specifically the invention relates to a system and method for holographic storage.

BACKGROUND

General holographic storage systems are discussed in "Holographic Memories", by Demetri Psaltis et. al., Scientific American, November 1995, which is hereby incorporated by reference. Holography is also discussed in the text Holographic Data Storage, by H. J. Coufal, D. Psaltis, and G. T. Sincerbox, Eds., copyright 2000, Springer-Verlag, which is hereby incorporated by reference. The basic principles of holography involve the recording of an interference pattern formed between two beams of light, referred to as an object beam and a reference beam. The object beam is encoded with data in a two dimensional pattern. The reference beam is used to form the interference pattern with the encoded object beam and is subsequently used to reconstruct the data by illuminating the recorded pattern.

In volume holographic storage, a large number of holograms are stored in the same volume region of a holographic storage medium. There are several well established methods of holographic storage, such as peristrophic multiplexing, angle multiplexing, shift multiplexing, wavelength multiplexing, correlation multiplexing, and phase multiplexing. Volume holography uses a thick recording medium, where the thickness dimension is associated with Bragg selectivity in the movement of the holographic storage medium in shift multiplexing or the angle change in angular multiplexing.

Angle multiplexing is a volume holography method for storing a plurality of images within a single photorefractive medium. Such angle multiplexing is discussed, for example, in "Holographic Memories", by Demetri Psaltis et. al., Scientific American, November 1995, and by P. J. van Heerden in, "Theory of Optical Information Storage In Solids," Applied Optics, Vol. 2, No. 4, page 393 (1963). Angle multiplexing generally involves storage of multiple pages of data in the same photorecording medium by altering the angle of the reference beam entering the crystal during storage of each page while maintaining the position of the object beam. The first page of data is recorded. The angle of the reference beam is then increased until the reconstruction of the first page disappears. Then a new page of data is substituted and holographically recorded. This process is repeated for each successive hologram that is recorded. Any of the recorded holograms can be viewed by illuminating the photorecording medium with a reference beam set at the appropriate angle.

Peristrophic multiplexing is also a volume holography method for storing a plurality of images within a single photorefractive medium. Peristrophic multiplexing is discussed in "Volume Holographic Multiplexing Methods", by G. Barbastathis and D. Psaltis, published in Holographic Data Storage, pages 22–59, by H. J. Coufal, D. Psaltis, and G. T. Sincerbox, Eds., copyright 2000, Springer-Verlag. Peristrophic multiplexing is also discussed in "Beam Deflectors and Spatial Light Modulators", by G. Zhou, F. Mok, and D. Psaltis. Peristrophic multiplexing generally involves rotation of the recording medium or rotation of the object and reference beam about an optical axis normal to the recording medium.

U.S. Pat. No. 5,483,365 entitled "Method for Holographic Storage Using Peristrophic Multiplexing", which is hereby incorporated by reference, describes a method of increasing hologram density by rotating the recording material comprising a thin-film photopolymer or, equivalently, by rotating beams used to record holograms in the material. During peristrophic multiplexing, the hologram may be physically rotated, with the axis of rotation being perpendicular to the film's surface every time a new hologram is stored. The rotation shifts the reconstructed image away from the detector, permitting a new hologram to be stored and viewed without interference, and the rotation can also cause the stored hologram to become non-Bragg matched. Peristrophic multiplexing can be combined with other multiplexing techniques such as angle multiplexing to increase the storage density. Thus, using a combination of peristrophic and angle multiplexing, for example, multiple stacks or sets of holograms can be created in the same volume location of a storage medium.

FIG. 7 illustrates the basic components of a prior art system described in U.S. Pat. No. 5,483,365 for implementing peristrophic and angular multiplexing. A beam splitter 10 splits a coherent monochromatic light beam from a laser 20 into a reference beam (R) and a signal beam (S) which are directed and collimated by optics 30 to a selected recording spot 40a in a holographic recording medium 40 such as a thin layer of lithium niobate and/or a photopolymer film. A spatial light modulator (SLM) 50 modulates the signal beam S in accordance with an input image I. A lens 55 of focal length F between the SLM 50 and the recording medium 40 is displaced from both the SLM 50 and the film 40 by its focal length F, as indicated in the drawing. The signal and reference beams S and R produce an interference pattern in the holographic recording medium 40 which is at least semi-permanently recorded therein. In order to read out the recorded hologram, the reference beam R is projected at the same angle to the same recording spot 40a, to produce an output beam O incident on a detector plane or focal plane array 60 through a spatial filter 70 with aperture A. A lens 80 of focal length F between the detector plane 60 and the film 40 is displaced from both the detector plane 60 and the film 40 by its focal length F.

Angular multiplexing is performed by applying a succession of input images to the spatial light modulator 50 while rotating the recording medium 40 about the Y axis through a corresponding succession of angles while the signal and reference beams S and R continue to illuminate the same recording spot 40a. The Y axis is perpendicular to the plane of interaction defined by the reference beam R and the signal beam S. The plane of interaction is defined such that both the reference beam R and the signal beam S lie in the plane of interaction. In addition to rotation of the holographic storage media, angular multiplexing in the past has been implemented by scanning the angle of the reference beam using a rotatable beam deflector used in conjunction with an imaging lens. Such a system is described in Holographic Data Storage, pages 241–257, by H. J. Coufal, D. Psaltis, and G. T. Sincerbox, Eds., copyright 2000, Springer-Verlag.

Peristrophic multiplexing is performed by applying a succession of input images to the spatial light modulator 50 while rotating the recording medium 40 about any axis that is not perpendicular to the plane of interaction through a corresponding succession of angles. In one preferred embodiment, this rotation is performed about the Z axis lying in the plane of selectivity. Alternatively the laser, beam splitter, and associated optics utilized to generate the reference beam can be rotated rather than the holographic storage media to implement peristrophic multiplexing. When angular and peristrophic multiplexing are combined, the invention is carried out by angularly multiplexing a maximum number of holograms in the selected recording spot 40*a*, rotating the medium by a predetermined angle about the Z axis (or any axis not perpendicular to the plane of interaction) and then angularly multiplexing another set of holograms in the same spot. This sequence is repeated until a maximum range of peristrophic multiplexing angles (rotation about the Z axis) has been reached. Then, the entire process is carried out at the next recording spot in the medium.

Although the prior art systems offer the ability to implement both angle and peristrophic multiplexing in the storing of a large number of holograms in a holographic storage media, there are disadvantages to existing systems. Mechanical rotation of the holographic storage media about one or more axis requires additional components and adds system complexity. Rotation of the laser, beam splitter, and associated optics utilized to generate the reference beam is difficult and also adds system complexity.

Thus, there has been a need for improvements in the storage of holograms. More specifically, there has been a need for improved systems and methods for implementing both angular and peristrophic multiplexing.

SUMMARY OF THE INVENTION

The present invention provides a solution to the needs described above through a system and method for holographic storage.

The present invention provides a system for storing holograms in a holographic storage medium. The system comprises a laser light source, a first beam splitter for splitting a light beam into an object and reference beam, an elliptical reflector with a first and second focal point, a reflector rotatable about a first axis and a second axis, a pattern encoder, and a holographic storage medium. The reflector is located at the first focal point of the elliptical mirror, and the holographic storage medium is located at the second focal point of the elliptical mirror.

The present invention provides a method for recording multiplexed holograms in a holographic storage medium. The method comprises providing a reference beam and a data carrying object beam. The data carrying object beam is directed to a holographic storage medium and the reference beam is directed to a rotatable reflector which is rotatable about a first axis and a second axis. The rotatable reflector is selectively rotated about the first or second axis to a select position. The reference beam is deflected from the rotatable deflector to an elliptical reflector, and the elliptical deflector further deflects the reference beam to the holographic storage medium where it interferes with the data carrying object beam to record a hologram.

The present invention further presents a method for reading multiplexed holograms recorded in a holographic storage medium. The method comprises providing a readout beam and directing the readout beam to a reflector which is rotatable about a first axis and a second axis. The reflector is selectively rotated about the first or second axis to a select position. The readout beam is deflected from the rotatable deflector to an elliptical reflector, and the elliptical deflector further deflects the readout beam to the holographic storage medium where it reconstructs a previously recorded hologram at the select position to produce a reconstruction beam. The reconstruction beam is then directed to a detector.

DESCRIPTION OF THE DRAWINGS

The features and advantages of the system and method of the present invention will be apparent from the following description in which.

DETAILED DESCRIPTION OF THE PREFERRED EMBODIMENTS

The present invention provides a solution to the needs described above through a system and method for holographic storage. The invention utilizes a rotatable mirror together with an elliptical mirror to implement both angular and peristrophic multiplexing when recording holograms in a holographic storage media.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
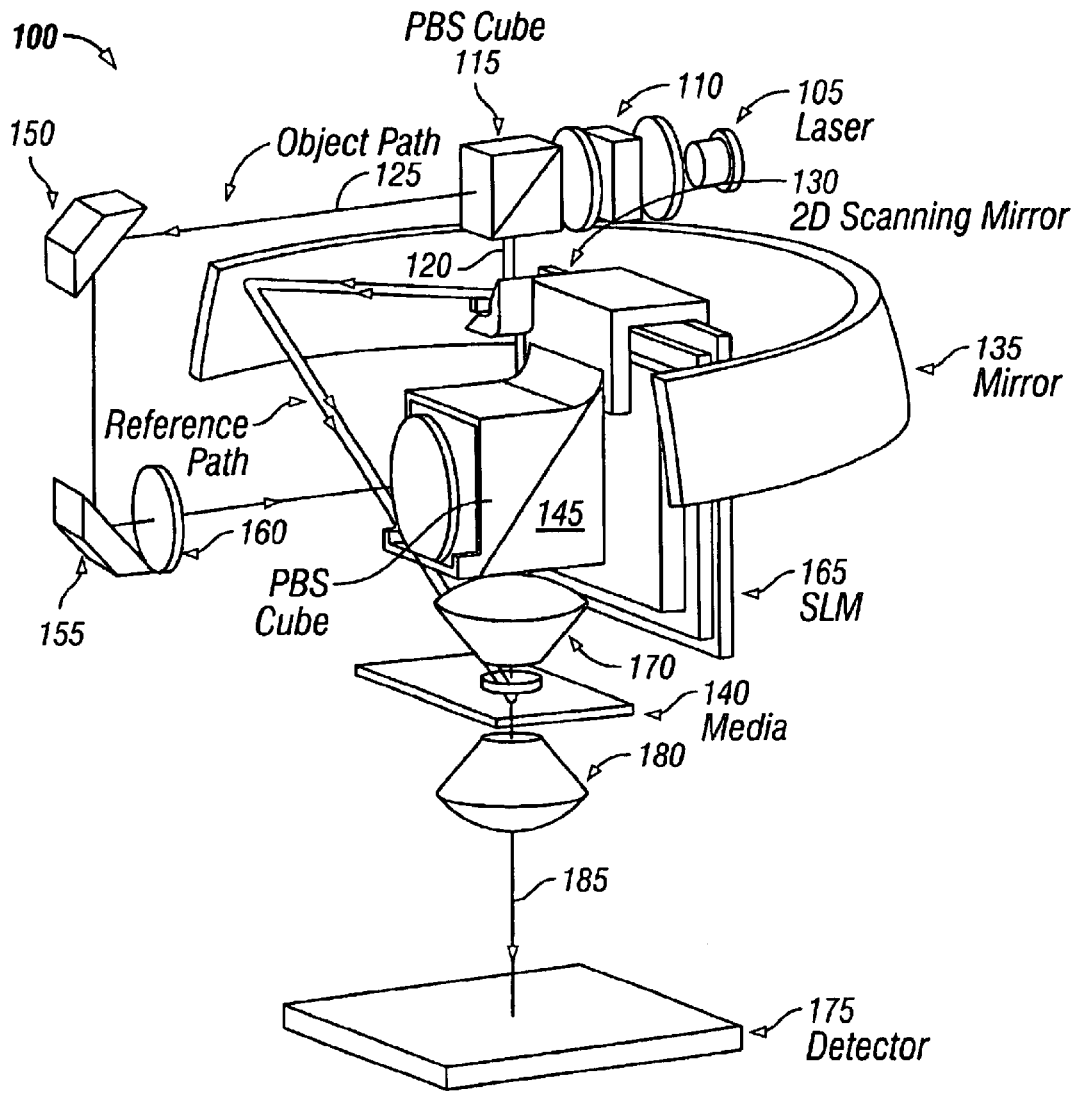
FIG. 1 is a diagram illustrating a presently preferred embodiment of the holographic storage system utilizing the invention.

Referring to FIG. 1, diagram of a basic configuration utilizing an embodiment of the system for holographic storage of the present invention is shown. The holographic storage system 100 of the present invention may be constructed using discrete optical components, such as lasers, lenses and mirrors. The holographic storage system 100 includes a laser light source 105. The coherent light from the laser light source 105 is split into a reference beam and an object beam. The reference beam and object beam are directed to a holographic storage medium where they interfere to record a hologram. Each hologram is often referred to as a "page," and typically comprises a two-dimensional array of data bits. Several pages can be stored at one location on the holographic storage medium utilizing multiplexing techniques.

Light generated by laser light source 105 is directed to a beam splitter 115, such as a polarizing beam splitter cube, which splits the light from laser light source 105 into a reference beam 120 and an object beam 125. Between the laser light source 105 and the beam splitter 115 are one or more lenses 110 for imaging or focussing the light emitted from the laser light source 105. Reference beam 120 is reflected by a rotatable address selection mirror 130 to an elliptical mirror 135. Elliptical mirror reflects the reference beam 120 to the holographic storage media 140. As discussed below, the rotatable address selection mirror 130 and elliptical mirror 135 control the incident angle at which the reference beam 120 is directed to holographic storage medium 140 such as a thin layer of lithium niobate film and/or a photopolymer film. The rotatable address selection mirror 130 and elliptical mirror 135 allow for both angular and peristrophic multiplexing of holograms.

As discussed above, in addition to reference beam 120, beam splitter 115 outputs an object beam 125, which is encoded with data and directed with various object beam optics to the holographic storage medium 140. Following is a description of an exemplary embodiment for encoding and directing the object beam, although other schemes may be used without departing from the intended scope of the present invention. Object beam 125 is directed to a beam splitter 145, such as a polarizing beam splitting cube, via one or more turning mirrors 150, 155. The object beam may pass through one or more imaging lenses 160 prior to reaching beam splitter 145. In the preferred embodiment, beam splitter 145 is a polarizing beam splitter cube.

Polarization of object beam 125 is controlled so that it passes through the polarizing beam splitter cube 145 to a pattern encoder 165. A data pattern is then imposed on the object beam 125 by a pattern encoder 165. Pattern encoder 165 may be a spatial light modulator ("SLM"), or any device capable of encoding the object beam, such as a fixed mask, or other page composer. Such pattern encoding is typically amplitude encoding. The pattern encoder 165 receives digitized data from a control system and imposes that pattern onto the object beam 125, such that the object beam 125 comprises an array of dark and light spots. In a preferred embodiment, pattern encoder 165 is a reflective spatial light modulator that also introduces a polarization rotation into the encoded object beam 125. The encoded object beam 125 is reflected by the reflective spatial light modulator and propagates back towards the polarizing beam splitter cube 145. The reflected object beam deflects off the diagonal interface of the polarizing beam splitter cube 145 to a lens 170 due to the polarization shift induced by the spatial light modulator.

The polarization of the reflected object beam must be of a polarization when it reaches the polarizing beam splitter cube such that the polarizing beam splitter deflects the object beam to lens 170. The required polarization at the polarizing beam splitter is dependent on the relative position of the spatial light modulator, polarizing beam splitter, and holographic storage media. In addition to the spatial light modulator, the polarization of the object beam can be altered prior to the polarizing beam splitter by additional quarter wave plates, half waveplates, or other polarization shifting devices anywhere in the path of the object beam. In a preferred embodiment, polarizing beam splitter 145 deflects linear polarized light. Lens 170 focuses the encoded object beam 125 to a particular site on the holographic storage media 140. The polarization of the reference beam 120 and encoded object beam 125 are the same at the holographic storage media so that interference occurs between the object beam and the reference beam. Interference between the reference beam 120 and the encoded object beam 125 produces an interference grating, recording a hologram.

During readout of information previously stored in the holographic storage media 140, object beam 125 is blocked from transmission and the reference beam R is projected at the same angle to the same spot on the holographic storage medium on which the desired information was previously stored. As reference beam 120 intersects holographic storage medium 140, the stored page is reconstructed and transmitted towards imaging lens 180, which may be an inverse Fourier transform lens in the preferred embodiment. Imaging lens 180 directs and images the reconstructed object beam 185 onto an optical detector 175. The reconstruction beam may be projected through a spatial filter with a given aperture located between lens 180 and optical detector 175. Optical detector 175 may be of conventional construction, for example a conventional photodiode array or other suitable detector array that transforms the encoded page into digitized data.

Figure 2:
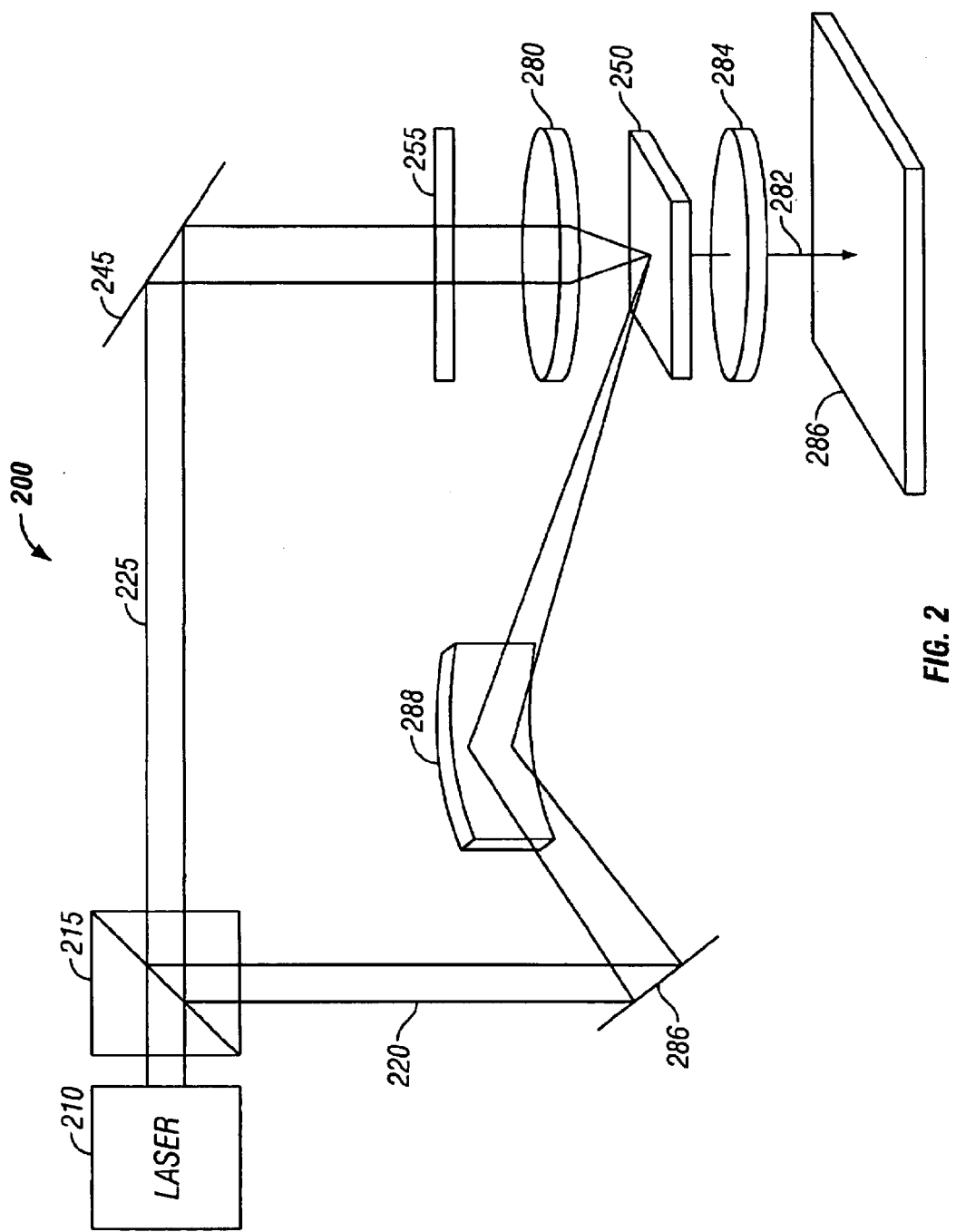
FIG. 2 is a block diagram illustrating a further embodiment of the holographic storage system utilizing the invention.

FIG. 2 illustrates a further embodiment of a system utilizing the present invention with a transmissive spatial light modulator configuration. The holographic storage system 200 includes a laser light source 210. The coherent light from the laser light source 210 is split into a reference beam 220 and an object beam 225. The reference beam and object beam are directed to a holographic storage medium to record and recall holographic information. Light generated by laser light source 210 is directed to a beam splitter 215, such as a polarizing beam splitter cube, which splits the light from laser light source 210 into a reference beam 220 and an object beam 225. Reference beam 220 is reflected by a rotatable address selection mirror 286 to an elliptical mirror 288. Elliptical mirror reflects the reference beam 220 to holographic storage media 250. In a further embodiment, one or more lenses may be used to image the reference beam on the holographic storage media 250.

Object beam 225 is directed to a turning mirror 245 which directs the object beam to a pattern encoder 255, which encodes the object beam with data. The object beam is then directed to a holographic storage media 250 with lens 280. Pattern encoder 255 may be a spatial light modulator ("SLM"), or any device capable of encoding the object beam, such as a fixed mask, or other page composer. The pattern encoder 255 receives digitized data and imposes that pattern onto the object beam 225, such that the object beam 225 comprises an array of dark and light spots. The encoded object beam 225 is then directed to lens 280 that focuses the encoded object beam 225 to a particular site on the holographic storage media 250.

During readout of holograms previously stored in the holographic storage media 250, object beam 225 is blocked from transmission and a reference beam is projected at the same angle to the same spot on the holographic storage medium on which the desired information was previously stored. As in the record process, the readout reference beam incident angle is controlled by address selection mirror 286 and elliptical mirror 288. Diffraction of the reference beam with the previously stored hologram generates a reconstruction beam 282 that reconstructs the previously stored hologram. The reconstructed beam is transmitted towards imaging lens 284 which directs and images the reconstruction beam onto the plane of the optical detector 286. The reconstruction beam may be projected though a spatial filter with a given aperture located between lens 284 and optical detector 286. Optical detector 286 may be a conventional photodiode array, charge coupled device or other suitable detector array that transforms the encoded page into digitized data.

Referring to FIG. 1, in a presently preferred embodiment the invention utilizes address selection mirror 130 and elliptical mirror 135 to achieve both angular and peristrophic multiplexing through rotation of the address selection mirror 130 about two different axes. FIG. 4 illustrates the rotation of the reference beam in a phi direction for peristrophic multiplexing. Planar angular multiplexing is achieved by rotation in a θ direction. One or both methods of multiplexing may be performed utilizing the present invention. Use of an embodiment of the present invention to achieve both angular and peristrophic multiplexing will be described in reference to FIGS. 3 and 4.

Figure 3:
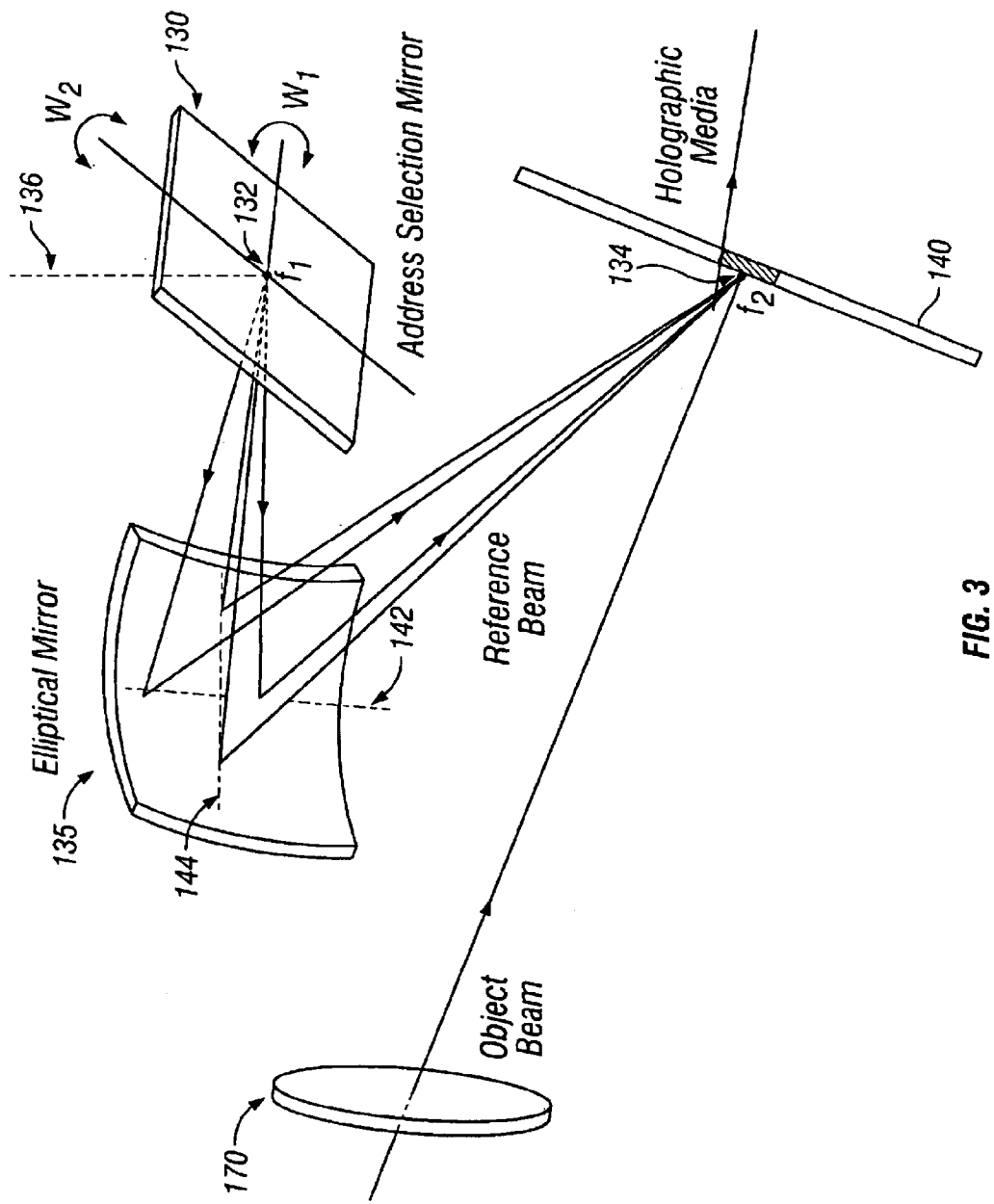
FIG. 3 is a diagram illustrating the storage of successive holograms on a holographic recording medium utilizing the present invention.
Figure 4:
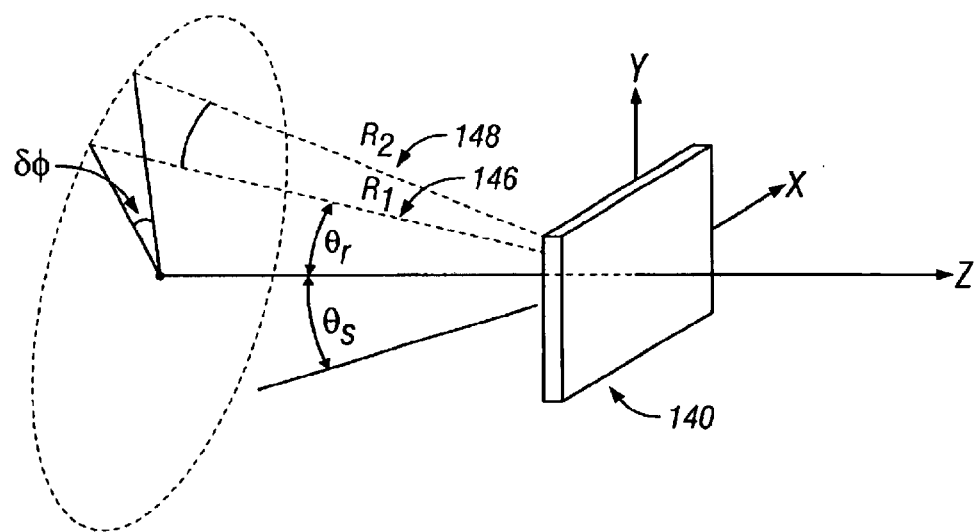
FIG. 4 is a diagram illustrating the storage of successive holograms on a holographic recording medium utilizing angular and peristrophic multiplexing.

Referring to FIG. 3, the address selection mirror 130 is located at a first focal point 132 of the elliptical mirror 135 and the holographic storage medium 140 is located at the second focal point 134 of the elliptical mirror 135. Any reference beam directed from address selection mirror 130 to a location on the elliptical mirror 135 is reflected by the elliptical mirror 135 to the holographic storage medium 140 at the second focal point. Rotation of the reference beam in a θ direction and φ direction is controlled by controlling the location on elliptical mirror 135 the reference beam is directed to by the address selection mirror 135. Address selection mirror 135 is rotated under control of a positioner and control electronics, which may include a stepper motor to rotate the address selection mirror 135 about a first and second axis, although any mechanism or method may be used to rotate the address selection mirror 135. Address selection mirror is rotated in an angular direction ω1 to direct reference beam 136 to locations along a y-axis 142 on the elliptical mirror 135, resulting in a different reference beam angle θ as the reference beam 136 is reflected from different points from the elliptical mirror 135. Address selection mirror is rotated in an angular direction $\omega_2$ to direct reference beam 136 to locations along an x-axis 144, resulting in a different reference beam angle φ as the reference beam 136 is reflected from different points from the elliptical mirror 135.

Referring to FIG. 4, a reference beam R1 146 is shown incident to holographic storage medium at an angle $\theta_R$ measured with respect to the normal of holographic storage medium 140 in the y-z plane as the reference beam is rotated about the y-axis. Reference beam R1 146 is incident to the holographic storage medium at an angle φ measured in the x-y plane as the reference beam is rotated about the normal of holographic storage medium 140. A second reference beam R2 148 is shown after address selection mirror 30 has been rotated in the angular direction $\omega_2$ by an amount θ prime, resulting in the reference beam 136 being directed to a different location along the x axis 144 of elliptical mirror 135, resulting in the reference beam R2 being rotated about the normal of the holographic storage medium by an amount Δφ. The holographic storage medium 140 may be translationally moved so as to allow different sites at the holographic storage medium to be addressed.

When the present invention is utilized to perform both angular and peristrophic multiplexing, the invention is carried out by angularly multiplexing a maximum number of holograms in a selected recording spot at the holographic storage medium 140, rotating the reference beam by a predetermined angle φ about the Z axis by rotating the address selection mirror 130 in the angular direction $\omega_2$ by an amount φ prime, and then angularly multiplexing another set of holograms in the same spot. This sequence is repeated until a maximum range of peristrophic multiplexing angles (rotation about the Z axis) has been reached. Then, the entire process is carried out at a next recording spot in the holographic storage medium 140.

In an alternative embodiment, the order of the angular multiplexing and peristrophic multiplexing steps may be reversed. Rotation about the angular multiplexing Y axis to the next angular multiplexing angle is performed by rotating the address selection mirror 130 in the angular direction $\omega_1$ by an amount θ, followed by a peristrophic rotation through successive peristrophic rotation angles while recording the next succession o holograms.

In another alternative embodiment, the order of the angular multiplexing and peristrophic multiplexing steps may be interleaved.

In a preferred embodiment, control electronics synchronize the spatial light modulator 165 with the rotation of the address selection mirror 130 in the angular direction $\omega_1$ during angular multiplexing and rotation of the address selection mirror 130 in the angular direction $\omega_2$ during peristrophic multiplexing. The control electronics may include a processor and memory containing instructions for storing and retrieving data. A selected one of the multiplexed holograms thus recorded in the holographic storage medium 140 is reconstructed or projected onto the detector 175 using the same procedure described above, except that only the reference beam is projected onto the holographic storage medium 140 as shown, the object beam being blocked or turned off by the spatial light modulator 165.

Figure 5:
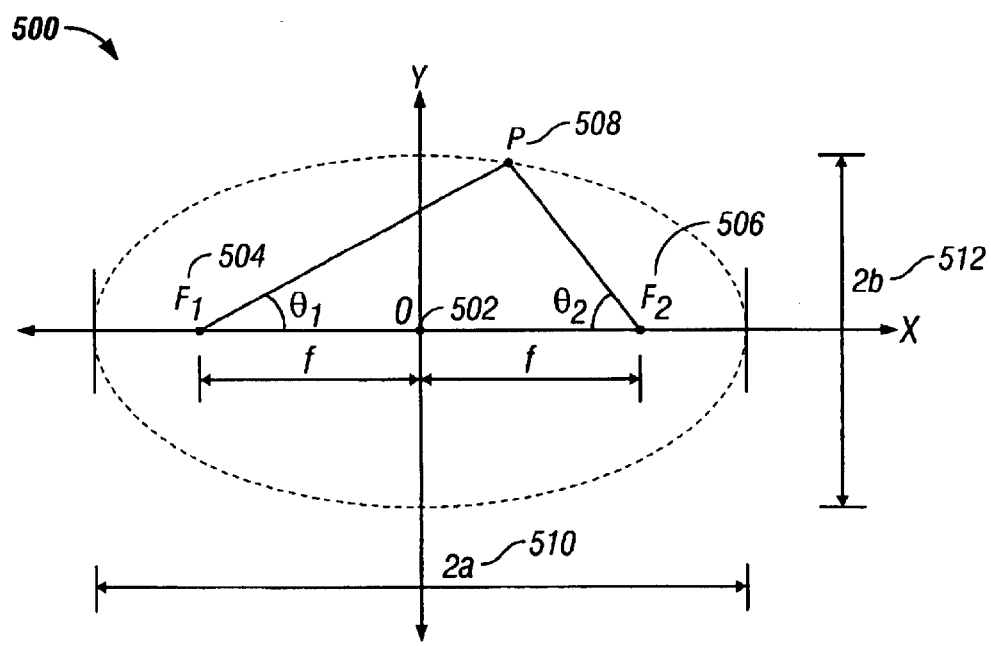
FIG. 5 is a diagram illustrating elliptical mirror principles of the present invention to selectively change the angle of incidence of the reference beam on a holographic storage medium.

The resulting change in the reference beam incident angle at the holographic storage media for a given amount of rotation of the rotatable address selection mirror can be adjusted. For example, referring to FIG. 5, a portion of an elliptical mirror 500 is shown with focal points $F_1$ 504 and $F_2$ 506, major axis length 2a 510, and minor axis length 2b 512. Ellipse 500 has a center point 502 located at O, with f= $\sqrt{a^2-b^2}$. An address selection mirror is located at focal point F1 504 and the holographic storage media is located at focal point $F_2$ 506. A point P 508 is selected on the surface of the ellipse about which the reference beam is scanned in order to implement angle multiplexing at the holographic storage media. The location of point P 508 determines the amount of change of the reference beam incident angle at the holographic storage media for a given amount of rotation of the rotatable mirror. The address selection mirror deflects the reference beam to the elliptical mirror at point P 508 at an angle $\theta_1$ defined by ∠$OF_1P$. The elliptical mirror deflects the reference beam to the holographic storage media at $F_2$ at an angle $\theta_2$ defined by ∠$OF_2P$.

The amount of change of $\theta_2$ ($\Delta\theta_2$) for a given change in $\theta_1$ ($\Delta\theta_1$) can be determined as follows:

$$(\Delta\theta_2)=(\gamma)(\Delta\theta_1)$$

at an initial $\theta_1$, where γ is an angle magnification factor. The parametric description of the reference beam leaving $F_1$ at an angle $\theta_1$ is $$-f+t\cos(\theta_1)=x$$

$$t\sin(\theta_1)=y$$

The parametric description of ellipse 500 is $$\frac{x^2}{a^2}+\frac{y^2}{b^2}=1$$

The point P is located at the coordinates of the interaction of the reference beam and the ellipse:

$\{t = \%1b, y = \%1b\sin(\theta_1), x = -f + \%1b\cos(\theta_1)\}$, where $\%1 :=$ $RootOf((b^2 - b^2\sin(\theta_1)^2 + \sin(\theta_1)^2 a^2) - Z^2 + f^2 - a^2 - 2f\cos(\theta_1)b - Z)$ The angle $\theta_2$ is then calculated from the intersection coordinates x and y:

$$\theta_2 = \arctan\left(\frac{y}{f-x}\right)$$

For example, for an ellipse with parameters a=2, b=1, and f=sqrt(3), $\theta_2$ for a given $\theta_1$ is $$\theta_2 = \arctan\left(\frac{RootOf((1+3\sin(\theta_1)^2) - Z^2 - 1 - 2\sqrt{3}\cos(\theta_1) - Zlabel = -L1)\sin(\theta_1)}{2\sqrt{3} - RootOf((1+3\sin(\theta_1)^2) - Z^2 - 1 - 2\sqrt{3}\cos(\theta_1) - Z, label = -L1)\cos(\theta_1)}\right)$$

Figure 6:
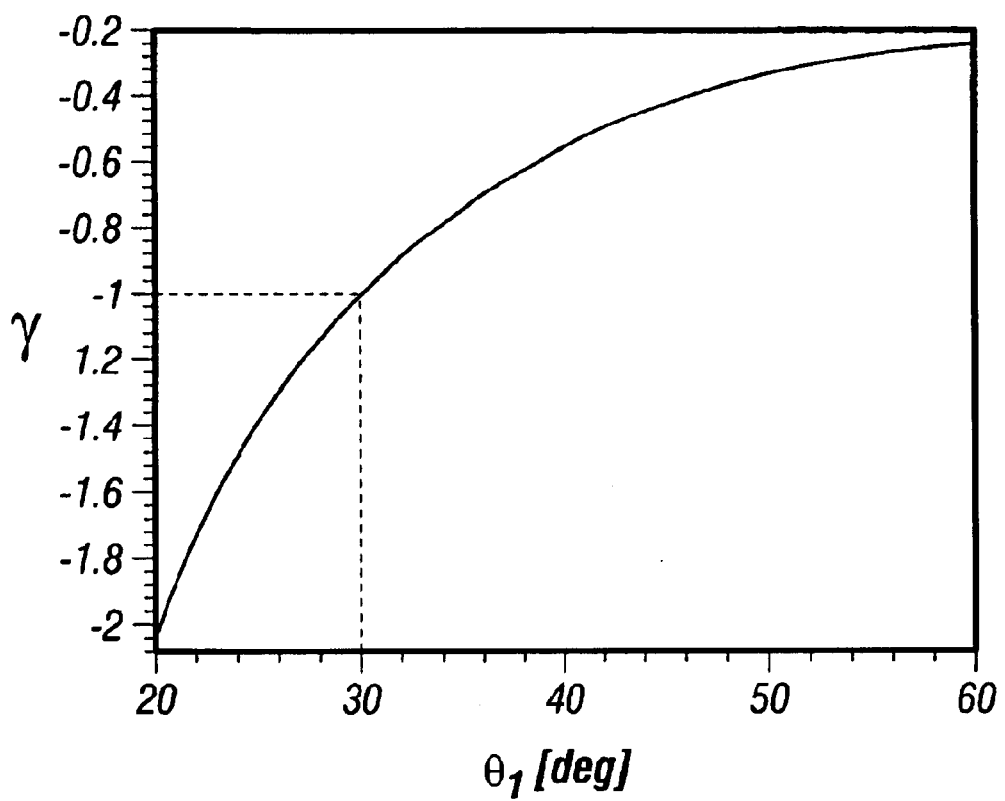
FIG. 6 is an illustrative plot of the angle magnification factor versus θ.
Figure 7:
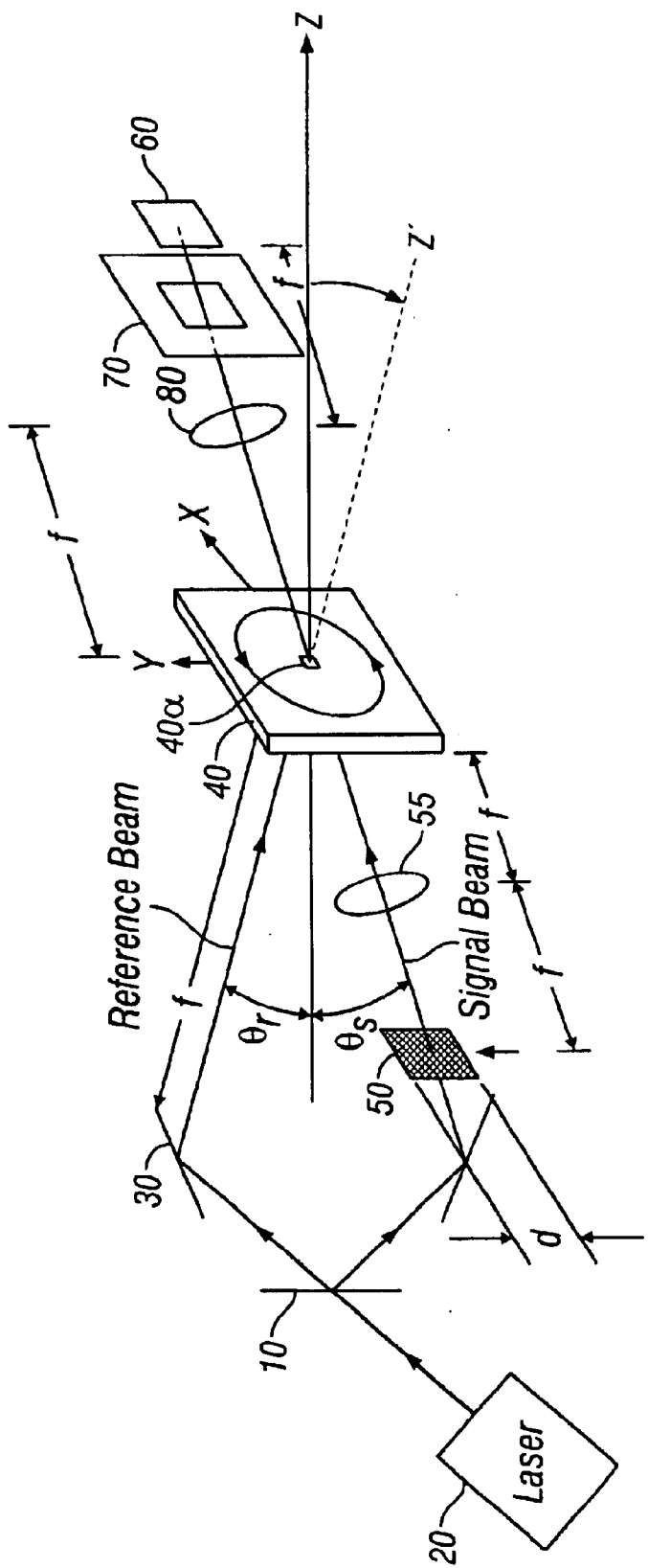
FIG. 7 is a prior art system for implementing angular and peristrophic multiplexing.

The relative change in $\theta_2$ for a change in $\theta_1$ is given by the derivative of $\theta_2$ with respect to the derivative of $\theta_1$. For example, if $\theta_1$=50 degrees, the relative angle change in $\theta_2$ is −0.3926747608. Hence the change of $\theta_1$ by 1 mdeg would change $\theta_2$ by −0.392 mdeg. Referring to FIG. 6, the angle magnification factor of the present example is plotted for values of $\theta_1$ from 20 degrees to 60 degrees. As can be seen from FIG. 6, $\gamma$=−1 where $\theta_1$=30 degrees. Thus, when $\theta_1$=30 degrees, a change of $\theta_1$ by one degree will result in a change of $\theta_2$ by one degree.

Having described the invention in terms of a preferred embodiment, it will be recognized by those skilled in the art that various types of optical components may be substituted for the configuration described above to achieve an equivalent result. For example, the embodiments discussed herein include descriptions of particular optical elements. It will be apparent to those skilled in the art that modifications and variations of the preferred embodiment are possible, and that other optical elements may be used to perform equivalent functions, all of which fall within the true spirit and scope of the invention as measured by the following claims.

What is claimed is:

1. A system for storing holograms in a holographic storage medium, the system comprising:
   a coherent light source;
   a first beam splitter for splitting a light beam into an object and reference beam;
   an elliptical reflector with a first and second focal point;
   a reflector rotatable about a first axis and a second axis, wherein the reflector is located at the first focal point;
   a pattern encoder; and
   a holographic storage medium located at the second focal point.

2. The system of claim 1, further comprising a control system to control the reflector rotatable about the first axis and the second axis and control the pattern encoder such that multiplexed holograms are recorded in the holographic storage medium.

3. The system of claim 1, further comprising one or more turning reflectors for positioning the object beam or reference beam.

4. The system of claim 1, further comprising a detector to detect a reconstructed object beam.

5. The system of claim 1, wherein the pattern encoder is a reflective spatial light modulator that encodes the object beam with data, reflects the encoded object beam and induces a polarization shift in the encoded object beam, and further comprising:
   a second beam splitter for deflecting the encoded object beam to the holographic storage medium.

6. The system of claim 1, wherein the pattern encoder is a transmissive spatial light modulator that encodes the object beam with data and directs the encoded object beam to the holographic storage medium.

7. A system for storing holograms in a holographic storage medium, the system comprising:
   a coherent light source for providing a coherent light beam;
   a first beam splitter for splitting the coherent light beam into an object beam and a reference beam;
   an elliptical reflector with a first and second focal point;
   a rotatable reflector rotatable about a first axis and a second axis, whereby the rotatable reflector is located at the second focal point of the elliptical reflector, and is operable to rotate about the first axis to direct the reference beam to multiple target locations on the elliptical reflector along a first elliptical mirror axis, and is operable to rotate about the second axis to direct the reference beam to multiple target locations on the elliptical reflector along a second elliptical mirror axis, whereby the elliptical reflector directs the reference beam at an incident angle to the holographic storage medium;
   a pattern encoder; and
   a holographic storage medium located at the first focal point.

8. The system of claim 7, further comprising a control system to rotate the reflector rotatable about the first axis and the second axis and control the pattern encoder such that angle and peristrophic multiplexed holograms are recorded in the holographic storage medium.

9. The system of claim 7, wherein the pattern encoder is a reflective spatial light modulator that encodes the object beam with data, reflects the encoded object beam and induces a polarization shift in the encoded object beam, and further comprising:
   a second beam splitter for deflecting the encoded object beam to the holographic storage medium.

10. The system of claim 7, wherein the pattern encoder is a transmissive spatial light modulator that encodes the object beam with data and directs the encoded object beam to the holographic storage medium.

11. The system of claim 7, further comprising one or more turning reflectors for positioning the object beam or reference beam.

12. The system of claim 7, further comprising a detector to detect a reconstructed object beam.

13. A method for recording multiplexed holograms in a holographic storage medium comprising:
   providing a reference beam and a data carrying object beam;
   directing the data carrying object beam to a holographic storage medium;
   directing the reference beam to a rotatable reflector rotatable about a first axis and a second axis; and
   selectively rotating the rotatable reflector about the first or second axis to a select position, wherein the reference beam is deflected from the rotatable deflector to an elliptical reflector, and wherein the elliptical deflector further deflects the reference beam to the holographic storage medium where it interferes with the data carrying object beam to record a hologram.

14. The method of claim 13, further comprising propagating the reference beam from the elliptical deflector through one or more lenses prior to the holographic storage medium.

15. A method for recording multiplexed holograms in a holographic storage medium comprising:

provide a reference beam and a plurality of data carrying object beams;

directing each data carrying object beam of the plurality of data carrying object beams to a holographic storage medium;

directing the reference beam to a rotatable reflector rotatable about a first axis and a second axis;

selectively rotating the rotatable reflector about the first axis through a succession of angles to deflect the reference beam to an elliptical reflector along a first axis of the elliptical reflector, wherein the elliptical reflector deflects the reference beam to the holographic storage medium at a succession of angle multiplexing angles, wherein the reference beam at each angle interferes with a different data carrying object beam to record a succession of angular multiplexed holograms; and selectively rotating the rotatable reflector about the second axis through a succession of angles to deflect the reference beam to an elliptical reflector along a second axis of the elliptical reflector, wherein the elliptical reflector deflects the reference beam to the holographic storage medium at a succession of peristrophic multiplexing angles, wherein the reference beam at each angle interferes with a different data carrying object beam to record a succession of peristrophic multiplexed holograms.

16. The method of claim 15, wherein the rotatable reflector is rotated about the first axis to produce all of the succession of angle multiplexing angles prior to rotation about the second axis to produce a successive peristrophic multiplexing angle.

17. The method of claim 15, wherein the rotatable reflector is rotated about the second axis to produce all of the succession of peristrophic multiplexing angles prior to rotation about the first axis to produce a successive angle multiplexing angle.

18. The method of claim 15, wherein rotating the rotatable reflector from a first angle to a second angle by a first angle difference results in rotation of the reference beam from a first angle to a second angle by a second angle difference, wherein the first angle difference and the second angle difference are associated by an angle magnification factor.

19. The method of claim 15, further comprising propagating the reference beam from the elliptical deflector through one or more lenses prior to the holographic storage medium.

20. A method for reading multiplexed holograms recorded in a holographic storage medium comprising:

providing a readout beam;

directing the readout beam to a rotatable reflector rotatable about a first axis and a second axis; and selectively rotating the rotatable reflector about the first or second axis to a select position, wherein the readout beam is deflected from the rotatable deflector to an elliptical reflector, and wherein the elliptical deflector further deflects the readout beam to the holographic storage medium where it reconstructs a previously recorded hologram at the select position to produce a reconstruction beam; and directing the reconstruction beam to a detector.

21. The method of claim 20, further comprising propagating the readout beam from the elliptical deflector through one or more lenses prior to the holographic storage medium.

* * * * *